Nov. 4, 1952

C. V. GAGEN 2,616,641

AIRCRAFT EQUALIZING BRAKE CONTROL VALVE

Filed May 31, 1946

INVENTOR.
CHARLES V. GAGEN.
BY
T. J. Plante
ATTORNEY.

Patented Nov. 4, 1952

2,616,641

UNITED STATES PATENT OFFICE 2,616,641

AIRCRAFT EQUALIZING BRAKE CONTROL VALVE

Charles V. Gagen, La Fayette, Ind., assignor to Bendix Aviation Corporation, South Bend, Ind., a corporation of Delaware Application May 31, 1946, Serial No. 673,718

4 Claims. (Cl. 244—111)

This invention relates to power control valves and has as its primary object the provision of a power control valve wherein the admission of fluid under pressure from a pressure source is under the control of fluid under pressure from a second pressure source, the latter pressure source being an operator operated control, such as the usual master cylinder.

In power brake systems for aircraft, it has heretofore been customary to provide a power control or regulating valve under the direct control of the operator and connected to the brakes by a suitable pressure-fluid-carrying conduit. The great distance which usually separates the control or regulating valve from the brakes results in an appreciable time lag in applying the brakes.

With the object of reducing this time lag, I propose to locate the control or regulating valve as closely as possible to the brakes themselves, and to provide suitable remote control means for operating said regulating valve.

In order to locate the power control valve in the vicinity of the brake, it is necessary to mount the valve on the airplane shock strut, and it is preferable to mount it on the lower portion of the strut, i. e. that portion which carries the ground surface contacting element, such as the axle and wheel. Because the position of the lower portion of the strut in comparison with the upper portion of the strut varies according to the load on the strut, the problem of controlling a power valve located in the vicinity of the brake is a difficult and complex one. I have found that the most satisfactory solution of the problem is to operate the control valve hydraulically by means of pressure developed by the operator in a master cylinder which is conveniently located in the body of the plane.

Figure 1:
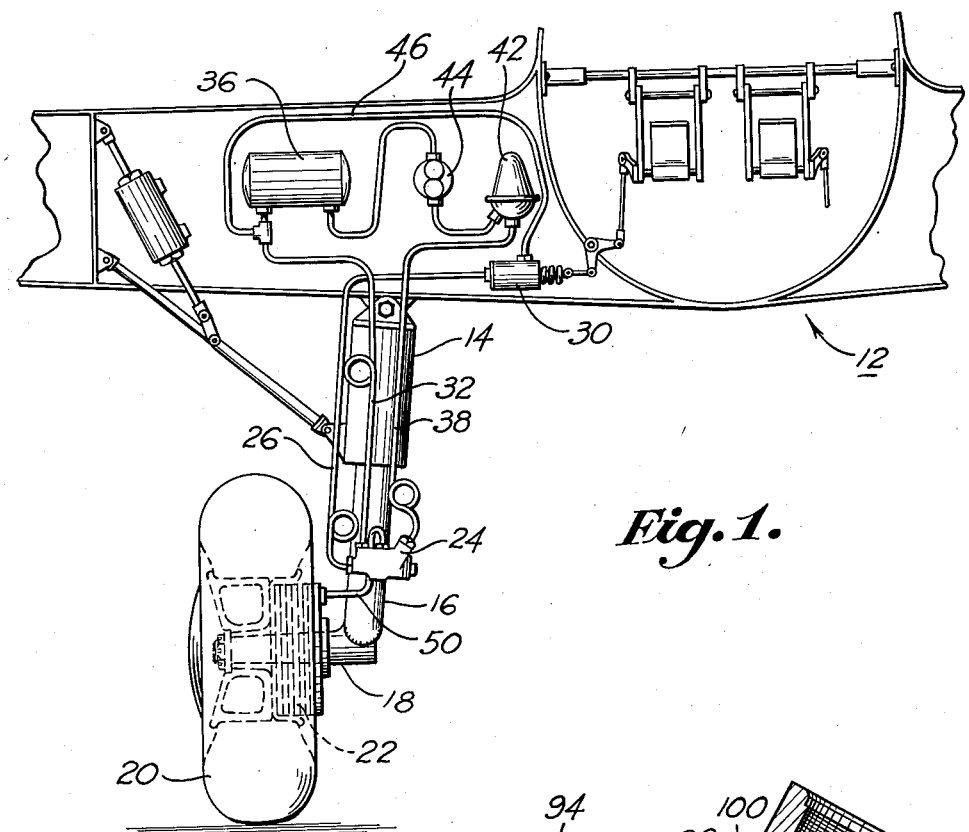
Figure 2:
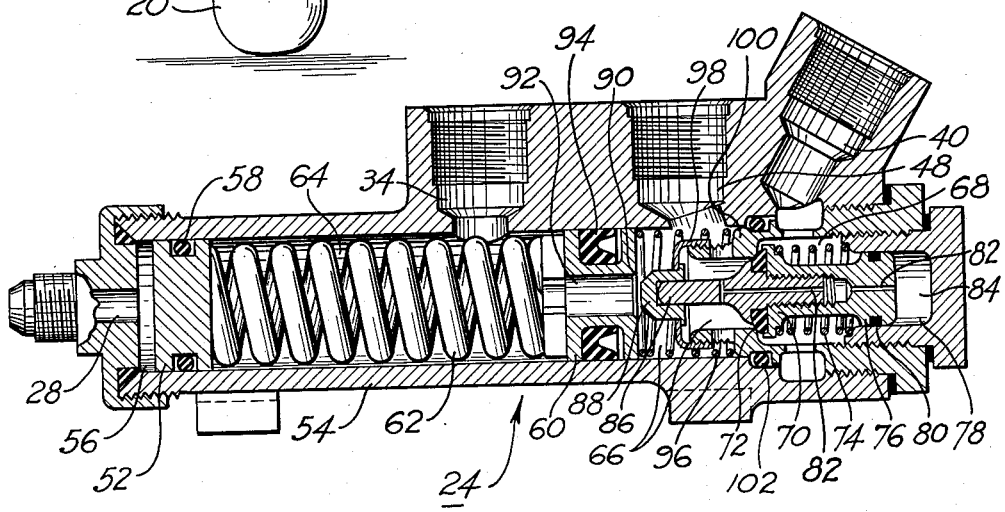

Other objects and advantages of the invention will become apparent during the course of the following description, reference being had therein to the accompanying drawings, in which:

Figure 1 is a diagrammatic view illustrating the power brake control system applied to an airplane; and Figure 2 is a cross-section taken through the hydraulically operated control or regulating valve of Figure 1.

Referring to the drawings, and first to Figure 1, the airplane 12 has the usual shock strut comprising an upper portion 14 secured to the body of the plane, and a lower portion 16 carrying the axle 18 and wheel 20, and telescopically combined with the upper portion 14. Associated with wheel 20 is a brake 22 which is under the control of a valve 24 carried by the lower portion 16 of the shock strut. A line 26 connects a port 28 (Figure 2) of control valve 24 with a master cylinder 30. A second line 32 connects a port 34 (Figure 2) of the control valve with a reservoir 36, which maintains a supply of liquid at atmospheric pressure. A third line 38 connects a port 40 (Figure 2) of the control valve 24 to a suitable pressure source, such as the accumulator 42. A pump 44 has its inlet connected to reservoir 36 and its outlet connected to accumulator 42. In order to supply master cylinder 30 with the needed liquid, a line 46 may extend from reservoir 36 to the master cylinder.

Control valve 24 is provided with a port 48 (Figure 2) which is connected by means of a line 50 with the hydraulically operable brake 22.

The master cylinder 30, the reservoir 36, the accumulator 42, and the pump 44 are all located in the body of the plane. The conduits 26, 32, and 38, which lead from the several units in the plane to the several ports of the control valve 24, are sufficiently flexible and are long enough to be unaffected by the telescoping movement of lower part 16 of the shock strut with respect to upper part 14.

As seen in Figure 2, which shows the detailed construction of the control valve 24, an actuating piston 52 is reciprocable in the casing 54 near that end of the casing at which is located the master cylinder port 28. Between piston 52 and the adjacent end of the casing is a chamber 56, which is in continuous communication with the master cylinder 30. A suitable annular seal 58 is carried by piston 52 to prevent escape of fluid from chamber 56 past the piston.

Located inwardly an appreciable distance from piston 52 is a reaction piston 60. A compression spring 62 bears at one end on the inner side of piston 52 and at the other end, on the outer side of piston 60, the forces transmitted from one piston to the other being conveyed through the medium of spring 62. The chamber, or space, 64 between pistons 52 and 60 is connected by port 34 with the reservoir 36.

A chamber 66 located at the side of piston 60 remote from piston 52 is connected by means of port 48 to the motor which actuates brake 22. Another chamber 68, which is provided at the opposite end of the valve from piston 52, is connected by means of port 40 to the accumulator 42. Chamber 68 is normally cut off from chamber 66 by means of a valve element 70, which is urged to contact valve seat 72 by a spring 74 and by the pressure differential between the pressure in chamber 68 and the pressure in chamber 66 (acting on a small annular area). In order to reduce the total force necessary to move valve element 70 away from valve seat 72, a plunger extension 76 is carried by valve element 70 and extends into a bore 78, plunger 76 carrying a suitable annular seal 80. The effective seating area of valve element 70, which is subjected to the pressure differential, is therefore reduced by an amount equal to the cross sectional area of plunger 76. A passage 82 extending through valve element 70 and plunger 76 interconnects chamber 84 in bore 78 with chamber 66.

Valve element 70, which is termed the inlet valve, is provided with a stem 86, which engages a valve element 88, the latter being termed the exhaust valve, and being adapted to engage valve seat 90 (provided on piston 60) whenever the piston has moved a given distance into chamber 66. Engagement of valve element 88 with valve seat 90 prevents flow of fluid through the passage 92 which normally interconnects chambers 64 and 66. A suitable annular seal 94 is provided at the periphery of piston 60 to prevent any communication of fluid between chambers 64 and 66 except through passage 92. A spring 96 urges piston 60 toward the left normally to hold it away from valve element 88, which is prevented from following the piston toward the left by means of a retaining nut 98 screwed onto the inner end of a member 100 (which also provides valve seat 72). A seal 102 is arranged to seal the periphery of member 100.

In operation, displacement of fluid under pressure from master cylinder 30 causes a pressure to be developed on the left face of piston 52. This pressure acts through spring 62 against piston 60, moving the latter piston toward the right to first bring valve seat 90 into contact with valve element 88, thereby cutting off communication between chambers 64 and 66. Additional rightward movement of piston 60 acts through valve element 88 and stem 86 of valve element 70 to lift the latter valve element from its seat against the resistance of spring 74 and whatever fluid pressure biases the valve element 70 to seated position. Fluid under pressure from the accumulator 42 is now admitted into chamber 66 and thus communicates with the operating motor of brake 22 to apply the brake. At the same time the pressure in chamber 66 acts against the right face of piston 60, urging it toward released position. Therefore, unless additional pressure is built up against piston 52 by increasing the pressure in master cylinder 30, piston 60 will be moved back toward the left sufficiently far to permit valve element 70 to seat. If this occurs, the valve is in "lapped" position, with both valve elements 70 and 88 seated. Additional pressure against piston 52 will once again lift valve element 70 from its seat to increase the pressure in chamber 66 and at the brake. It will be apparent that, as the pressures in the control valve are increased, the spring 62 will be gradually compressed, thereby increasing the volume of chamber 56. Because the operator, in order to progressively increase the brake applying pressure, must both displace brake fluid to chamber 56 and also increase the pressure of said fluid, operation of the control valve is both pressure-sensitive and position-sensitive, thus providing a "feel" which closely simulates the action of the brake.

As soon as the pressure in master cylinder 30 is released, springs 96 and 62 will return pistons 60 and 52 to released position, in which chamber 66 is cut off from chamber 68 and is in communication with the reservoir 36 through chamber 64.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use on an airplane having a two part telescoping shock strut, one part of which is carried by the body of the plane and the other part of which carries the airplane wheel, means for causing application of a brake associated with said wheel comprising a source of pressure liquid, a reservoir, and an operator operated master cylinder, all located in the body of the plane, and a power brake control device having a casing carried by the wheel-carrying part of the shock strut, a conduit connecting one end of said casing to the master cylinder, a first piston in the casing near the master cylinder-connected end, the outer face of the piston being subject to the pressure transmitted from the master cylinder, a seal preventing flow of fluid past said first piston, a second piston in the casing spaced inwardly from the first piston, a spring compressed between the inner face of the first piston and the outer face of the second piston, a conduit connecting the reservoir to the space between the pistons, a first chamber in the casing which communicates with the brake, said second piston having a normally open passage therethrough which interconnects the space between the pistons with said first chamber, a second chamber in the casing which communicates with the source of pressure liquid, a first valve element adapted to close the passage through said second piston when said piston moves a predetermined distance into said first chamber, a second valve element which is normally in closed position but which is caused to open to permit communication between the first and second chambers whenever said second piston moves beyond the point at which the first valve element closes the aforementioned passage, and spring means biasing said second valve element to closed position the pressure exerted by the fluid in said first chamber against said second piston being resisted by the operator of the master cylinder.

2. For use on an airplane having a two part telescoping shock strut, one part of which is carried by the body of the plane and the other part of which carries the airplane wheel, means for causing application of a brake associated with said wheel comprising a source of pressure liquid, a reservoir, and an operator operated master cylinder, all located in the body of the plane, and a power brake control device having a casing carried by the wheel-carrying part of the shock strut, a conduit connecting one end of said casing to the master cylinder, a first piston in the casing near the master cylinder-connected end, the outer face of the piston being subject to the pressure transmitted from the master cylinder, a second piston in the casing spaced inwardly from the first piston, a spring compressed between the inner face of the first piston and the outer face of the second piston, a first chamber in the casing which communicates with the brake, means normally connecting said first chamber to the reservoir, a second chamber in the casing which communicates with the source of pressure liquid, and valve means adapted to connect or disconnect the first chamber from the reservoir and the second chamber, said valve means being controlled by movement of said second piston, the pressure exerted by the fluid in said first chamber against said second piston being resisted by the operator of the master cylinder.

3. For use on an airplane having a two part telescoping shock strut, one part of which is carried by the body of the plane and the other part of which carries the airplane wheel, means for causing application of a brake associated with said wheel comprising a source of pressure liquid, liquid-containing means, and an operator operated liquid pressure generating device, all located in the body of the plane, and a power brake control device having a casing carried by the wheel-carrying part of the shock strut, a conduit connecting one end of said casing to the liquid pressure generating device, a first piston in the casing near one end, the outer face of the piston being subject to the pressure transmitted from the liquid pressure generating device, a second piston in the casing spaced inwardly from the first piston, a spring compressed between the inner face of the first piston and the outer face of the second piston, a first chamber in the casing which communicates with the brake, means normally connecting said first chamber to the liquid-containing means, a second chamber in the casing which communicates with the source of pressure liquid, and valve means adapted to connect or disconnect the first chamber from the liquid-containing means and the second chamber, said valve means being controlled by movement of said second piston, the pressure exerted by the fluid in said first chamber against said second piston being resisted by the operator of the liquid pressure generating device.

4. For use on an airplane having a shock strut constituted by relatively movable elements, one element being carried by the body of the airplane and the other element carrying the airplane wheel, means for causing application of a brake associated with said wheel and comprising a source of pressure liquid, liquid-containing means, and an operator operated liquid pressure generating device, all located in the body of the airplane, and a power brake control device carried by the wheel-carrying element of the shock strut and connected to said brake for operating same, a conduit leading from the liquid pressure generating device to the power brake device for controlling the operation of the latter, means normally connecting said power brake device to the liquid-containing means for receiving liquid exhausted from said power brake device, and means connecting said power brake device with the source of pressure liquid, said power brake device being controllable by said liquid pressure generating device for regulating the communication of pressure liquid from the source of pressure liquid to the brakes.

CHARLES V. GAGEN.

REFERENCES CITED

The following references are of record in the file of this patent:

UNITED STATES PATENTS

| Number | Name | Date |
| --- | --- | --- |
| 1,814,576 | Tatter | July 14, 1931 |
| 1,851,623 | Flader | Mar. 29, 1932 |
| 1,874,297 | Ives | Aug. 30, 1932 |
| 1,962,857 | Cash | June 12, 1934 |
| 2,028,631 | Stevens | Jan. 21, 1936 |
| 2,365,531 | DuBois | Dec. 19, 1944 |
| 2,400,587 | Livers | May 21, 1946 |
| 2,430,811 | Gardiner | Nov. 11, 1947 |
| 2,452,647 | Gagen | Nov. 2, 1948 |
| 2,459,665 | Majneri | Jan. 18, 1949 |